United States Patent
Cho et al.

(10) Patent No.: US 10,220,828 B2
(45) Date of Patent: Mar. 5, 2019

(54) ENGINE IDLE OPERATION CONTROL METHOD AND SYSTEM FOR HEATING OF HYBRID ELECTRIC VEHICLE

(71) Applicants: Hyundai Motor Company, Seoul (KR); Kia Motors Corporation, Seoul (KR)

(72) Inventors: In Eok Cho, Incheon (KR); Hoon Han, Gyeonggi-do (KR); Yong Kak Choi, Seoul (KR); Il Kwon Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 245 days.

(21) Appl. No.: 14/928,390

(22) Filed: Oct. 30, 2015

(65) Prior Publication Data

US 2016/0159339 A1 Jun. 9, 2016

(30) Foreign Application Priority Data

Dec. 3, 2014 (KR) .................. 10-2014-0171900

(51) Int. Cl.
*B60W 20/15* (2016.01)
*B60W 10/06* (2006.01)
(Continued)

(52) U.S. Cl.
CPC ............ *B60W 20/15* (2016.01); *B60K 6/442* (2013.01); *B60K 6/485* (2013.01); *B60W 10/06* (2013.01); *B60W 10/08* (2013.01); *B60K 2006/4825* (2013.01); *B60W 2510/244* (2013.01); *B60W 2550/12* (2013.01); *B60W 2550/141* (2013.01);
(Continued)

(58) Field of Classification Search
None
See application file for complete search history.

(56) References Cited

U.S. PATENT DOCUMENTS

2012/0302397 A1 11/2012 Habbani
2013/0253748 A1 9/2013 Kiuchi
(Continued)

FOREIGN PATENT DOCUMENTS

JP 2008-168699 A 7/2008
JP 2012-091645 A 5/2012
(Continued)

*Primary Examiner* — Mussa A Shaawat
*Assistant Examiner* — Kyung J Kim
(74) *Attorney, Agent, or Firm* — Mintz Levin Cohn Ferris Glovsky and Popeo, P.C.; Peter F. Corless (57) ABSTRACT

An engine idle operation control method and system are provided to improve the fuel efficiency of a vehicle through maintenance of efficient battery SOC and charge control during the engine-on for heating of a vehicle. The method includes receiving an engine-on request for heating of the vehicle and determining a road condition. A target charge power is determined and set as a value corresponding to the road condition and battery state information. A basic idle RPM set as a value corresponding to the road condition, the target charge power, and the outdoor temperature is determined. A compensation RPM and a target idle RPM are determined by compensating for the basic idle RPM by the compensation RPM to adjust the engine idle driving into the determined target idle RPM during the heating of the vehicle.

14 Claims, 4 Drawing Sheets

(51) Int. Cl.
*B60W 10/08* (2006.01)
*B60K 6/442* (2007.10)
*B60K 6/485* (2007.10)
*B60K 6/48* (2007.10)

(52) U.S. Cl.
CPC ............... *B60W 2710/0644* (2013.01); *B60W 2710/0666* (2013.01); *Y02T 10/6226* (2013.01); *Y02T 10/6234* (2013.01); *Y02T 10/6252* (2013.01); *Y02T 10/6286* (2013.01); *Y10S 903/93* (2013.01)

(56) References Cited

U.S. PATENT DOCUMENTS

2014/0171260 A1* 6/2014 Dalum ................. B60W 20/10
  477/5
2014/0211962 A1* 7/2014 Davis ................. G10K 11/1788
  381/86

FOREIGN PATENT DOCUMENTS

| JP | 2013-193533 A | 9/2013 |
|---|---|---|
| KR | 10-2005-0108712 A | 11/2005 |
| KR | 10-0789359 | 12/2007 |
| KR | 10-2009-0040716 A | 4/2009 |
| KR | 10-2010-0064721 | 6/2010 |
| KR | 10-2012-0062412 A | 6/2012 |

* cited by examiner

FIG.1

RELATED ART

FIG.2

RELATED ART

FIG.3

RELATED ART

FIG.4

RELATED ART

FIG.5

RELATED ART

FIG.6

ENGINE IDLE OPERATION CONTROL METHOD AND SYSTEM FOR HEATING OF HYBRID ELECTRIC VEHICLE

CROSS-REFERENCE TO RELATED APPLICATION

This application claims under 35 U.S.C. § 119(a) the benefit of Korean Patent Application No. 10-2014-0171900 filed Dec. 3, 2014, the entire contents of which are incorporated herein by reference.

BACKGROUND

(a) Technical Field

The present invention relates to an engine operation control method and system for a hybrid electric vehicle, and more particularly, to an engine operation method and system for controlling an engine into an idle state upon engine-on for heating of a hybrid electric vehicle.

(b) Background Art

Generally, vehicles are equipped with a Heating, Ventilation and Air Conditioning (HVAC) System for adjusting the indoor temperature. Recently, a Full Automatic Temperature Control (FATC) system has been applied to vehicles to maintain a temperature controlled environment by automatically adjusting the indoor temperature based on the temperature set by a driver or a passenger.

In the FATC system, when a user sets the temperature, an air conditioning controller (FATC controller) is configured to receive the detection signals of sensors such as a solar radiation sensor for detecting the solar radiation, an external temperature sensor for detecting the external temperature, and an in-vehicle temperature sensor for detecting the indoor temperature, and calculate the thermal load of the interior based on the detected values of each sensor to adjust the indoor temperature. In consideration of the air conditioning load corresponding thereto, the discharge mode, the discharge temperature, the discharge direction, and the discharge air volume are determined.

Furthermore, to adjust the indoor temperature and the system operation, the air conditioning controller is configured to receive detected values of a discharge temperature sensor for detecting the discharge temperature, a heater temperature sensor for detecting the temperature of an electric heater (e.g., PTC heater; used as an auxiliary heater for an internal combustion engine, and used as a main heater for an electric vehicle), and an evaporator temperature sensor for detecting the temperature of an evaporator, and operate elements such as a mode actuator, a temp. door (e.g., temperature control door) actuator, a wind direction control door (mode door) actuator, an air conditioning blower, a compressor, and an electric heater.

Figure 1:
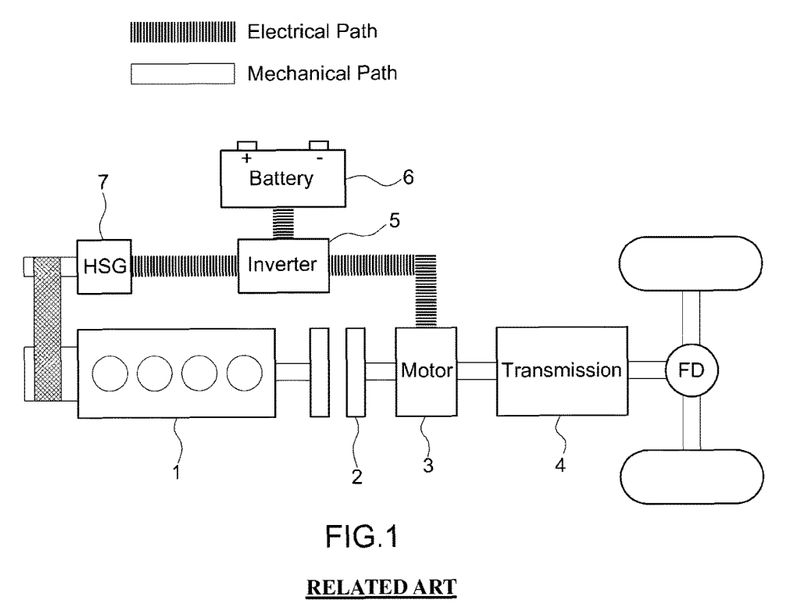
FIG. 1 is a view illustrating a power train of a hybrid electric vehicle according to the related art.

Meanwhile, a hybrid electric vehicle, which is a vehicle that is driven using an engine and an electric motor (drive motor) as driving sources, is an eco-friendly vehicle that reduces exhaust gases and improves fuel efficiency by using electric energy together with energy of fossil fuel. FIG. 1 is a view illustrating a hybrid power train including an engine and a drive motor which are driving sources for driving a vehicle, and an engine clutch and a transmission for transmitting power in a hybrid electric vehicle.

As shown in FIG. 1, the power train in a hybrid electric vehicle includes an engine 1 and a motor 3 disposed in series as driving sources of a vehicle, an engine clutch 2 interposed between the engine and the motor to transmit or interrupt power between the engine 1 and the drive motor 3, an inverter 5 for driving and operating the motor 3, a transmission 4 that changes the rotational speed of the engine 1 and the motor 3 and delivers driving power to the drive shaft, and a Hybrid Starter and Generator (HSG) 7 connected to the engine 1 to enable the transmission of driving power and starting engine 1 or generating electricity with the driving power delivered from the engine 1.

Additionally, a battery 6 used as a power source of a vehicle is chargeably/dischargeably connected to the drive motor 3 that is a high-capacity motor and the HSG 7 that is a low-capacity motor via the inverter 5. The engine clutch 2 is configured to selectively transmit or interrupt power between the engine 1 and the drive motor 3 through lock-up and open operations by a hydraulic pressure.

The transmission 4 is connected to the output side of the drive motor 3 and is configured to transmit power of the engine and the drive motor to the drive shaft, and may include a Manual Transmission (MT), an Automatic Transmission (AT), an Automatic Manual Transmission (AMT), or a Double Clutch Transmission (DCT). In addition, inverter 5 is configured to convert a direct current of the battery 6 to a three-phase alternating current and apply the alternating current for driving of the drive motor 3 and the HSG 7.

In typical hybrid electric vehicles, the driving mode is selected based on the driving conditions. A hybrid electric vehicle is driven in Electric Vehicle (EV) mode which uses the driving power of the drive motor 3, or in Hybrid Electric Vehicle (HEV) mode which uses both driving powers of the engine 1 and the drive motor 3. Further, upon braking of a vehicle or coasting by the inertia, a regenerative mode is performed in which braking and inertial energies are recovered by power generation operation of the drive motor 3 to charge the battery 6. In addition, the HSG 7 is also configured to charge the battery 6 by operating as a generator using power of the engine 1 or operating as a generator by the power delivered through the engine 1 under the regenerative condition.

A hybrid electric vehicle is capable of stopping the engine 1 when a vehicle stops, and is capable of being operated in an EV mode using the drive motor 3 when a vehicle runs at a substantially low speed or at a substantially low torque. Additionally, under the HEV driving condition, since the high-efficiency operating point driving of the engine and the optimal efficiency driving of the whole hybrid system is achieved through the optimal torque distribution of the engine 1 and the drive motor 1, a hybrid electric vehicle has a fuel efficiency greater than a typical internal combustion engine vehicle.

However, upon driving of a hybrid electric vehicle under a substantially low temperature condition in winter or during colder weather months, since the engine is required to be operated and maintained in idle state to secure the heating performance even in an EV driving mode or in vehicle stop state which could increase the fuel efficiency, the fuel efficiency is reduced compared to a general driving condition. Accordingly, the leading cause of reduction in the fuel efficiency during the driving in winter may be a loss caused by the engine idle driving for solving the heating load.

Figure 2:
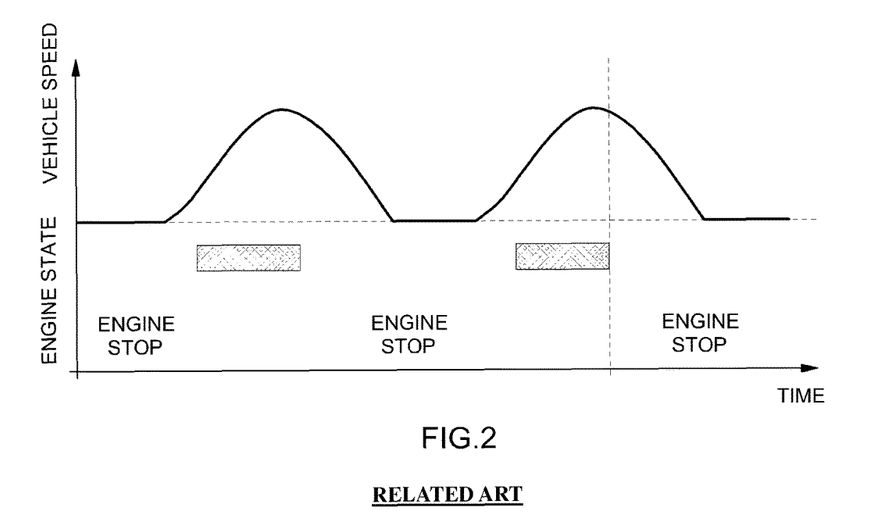
FIGS. 2 and 3 are views illustrating engine states during the driving of a hybrid electric vehicle according to the related art.
Figure 3:
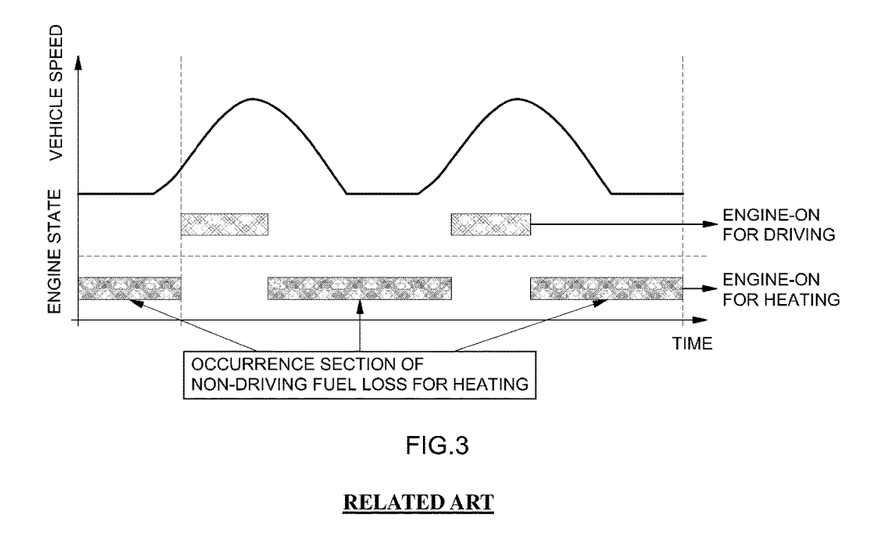

FIGS. 2 and 3 are views illustrating the engine state during the driving of a hybrid electric vehicle according to the related art. FIG. 2 illustrates the engine state under the condition that heating is unnecessary, and FIG. 3 illustrates the engine state under the condition that heating is necessary due to exterior temperature.

Since a hybrid electric vehicle is equipped with an engine which is used as a heating source, heating is performed by passing high-temperature cooling water through a heater core to heat-exchange between high-temperature cooling water and air (e.g., indoor air and outdoor air) and allowing cool air to pass through the heater core and then supplying heated air into the vehicle. In particular, the temp. door is used to adjust the indoor temperature, and the location and the open degree of the temp. door is changed to adjust the discharge temperature.

As shown in FIG. 2, under the condition that heating is unnecessary, the engine is stopped in the conditions that the engine driving is unnecessary such as the EV driving mode or stop state. However, when heating is necessary in winter, as shown in FIG. 3, the engine is maintained in an on-state (e.g., an idle state for heating even when the engine driving is unnecessary). Thus, when the engine is in the on-state for heating, the engine is operated into the idle state.

Comparing FIG. 2 and FIG. 3, the engine-on time under the condition that heating is necessary is longer than the engine-on time under the condition that heating is unnecessary. Additionally, a non-driving fuel loss occurs in an engine-one section for simple heating. Thus, these act as a factor of the fuel efficiency reduction in winter season. In a hybrid electric vehicle, when heating is required in winter season, engine-on/off for heating is determined based on the outdoor temperature and the temperature of cooling water (e.g., temperature of engine cooling water).

Figure 4:
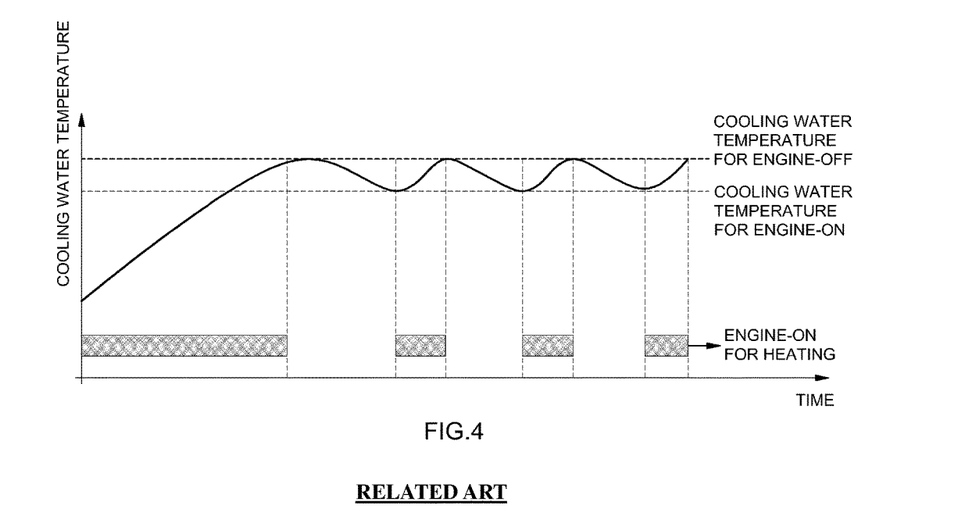
FIG. 4 is a view illustrating an engine-on/off control state according to the temperature of cooling water under a heating condition of a hybrid electric vehicle according to the related art.

For example, when a vehicle is in a stop state under the heating condition of winter season, as shown in FIG. 4, the engine repeats on/off based on the temperature of cooling water. In particular, since cool air is heated using heat of cooling water in the heater core, the temperature of cooling water is decreased due to heat-exchange in the engine-off (e.g., engine stop) state during the heating.

In addition, when the discharge temperature is adjusted by changing the location and the opening degree of the temp. door to adjust the indoor temperature, the heat loss of cooling water for heating increases as the amount of cold air increases (i.e., the driving intensity of the air conditioning blower increases), and as the open degree of the temp. door increases. Thus, the engine-on time for heating increases.

Meanwhile, a hybrid electric vehicle is equipped with the HSG 7 operating as a generator to perform power generation with power delivered from the engine 1 regardless of the vehicle driving and a low-capacity motor capable of adjusting the engine state. The HSG 7 is power-transmittably connected to the engine 1 (see FIG. 1).

When the engine is turned on and driven regardless of the vehicle driving, the HSG 7 generates power while adjusting the revolutions per minute (RPM) of the engine and the charge power, and electric energy generated in this case is stored and charged into the battery 6. In the engine-on condition for heating and a section where the lock-up of the engine clutch 2 for power transmission between the engine 1 and the drive motor 3 is impossible, engine idle charging is performed in which the battery 6 is charged by electric energy generated in the HSG 7 that is a low-capacity motor during the engine idle operation.

In particular, since the capacity of the HSG 7 is minimal, there is a limitation in regards to the operation of a region of high engine efficiency. Additionally, in a section where the lock-up of the engine clutch 2 for power transmission between the engine 1 and the drive motor 3 is possible, the battery 6 may be charged by the drive motor 3 that is a high-capacity motor during the driving of the vehicle, and it is possible to operate the engine in a region of sufficient engine efficiency through the distribution of power necessary for the running.

In other words, as the RPM of the engine decreases to a torque (e.g., greater than the torque of the HSG that is a low-capacity motor) of a specific region and as the engine torque increases, the efficiency of the engine increases. Further, as the RPM increases, the temperature of cooling water quickly increases. In a typical hybrid electric vehicle, when heating is required or requested in winter season, an air conditioning controller (Full Auto Temperature Controller (FATC)) is configured to request engine-on from a vehicle controller (Hybrid Control Unit; HCT).

In addition, the heating load of a vehicle, i.e., engine idle RPM based on the outdoor temperature is determined, and then the vehicle controller and the engine controller (Engine Control Unit; ECU) are configured to turn on the engine through cooperative control. Particularly, under the operation of the vehicle controller, the HSG 7 is driven to start the engine 1, and then the engine is driven into the idle driving state while the engine clutch 5 is in an open state. While heating is being performed, the engine controller is configured to operate and maintain the engine at the idle state based on the determined idle RPM.

Figure 5:
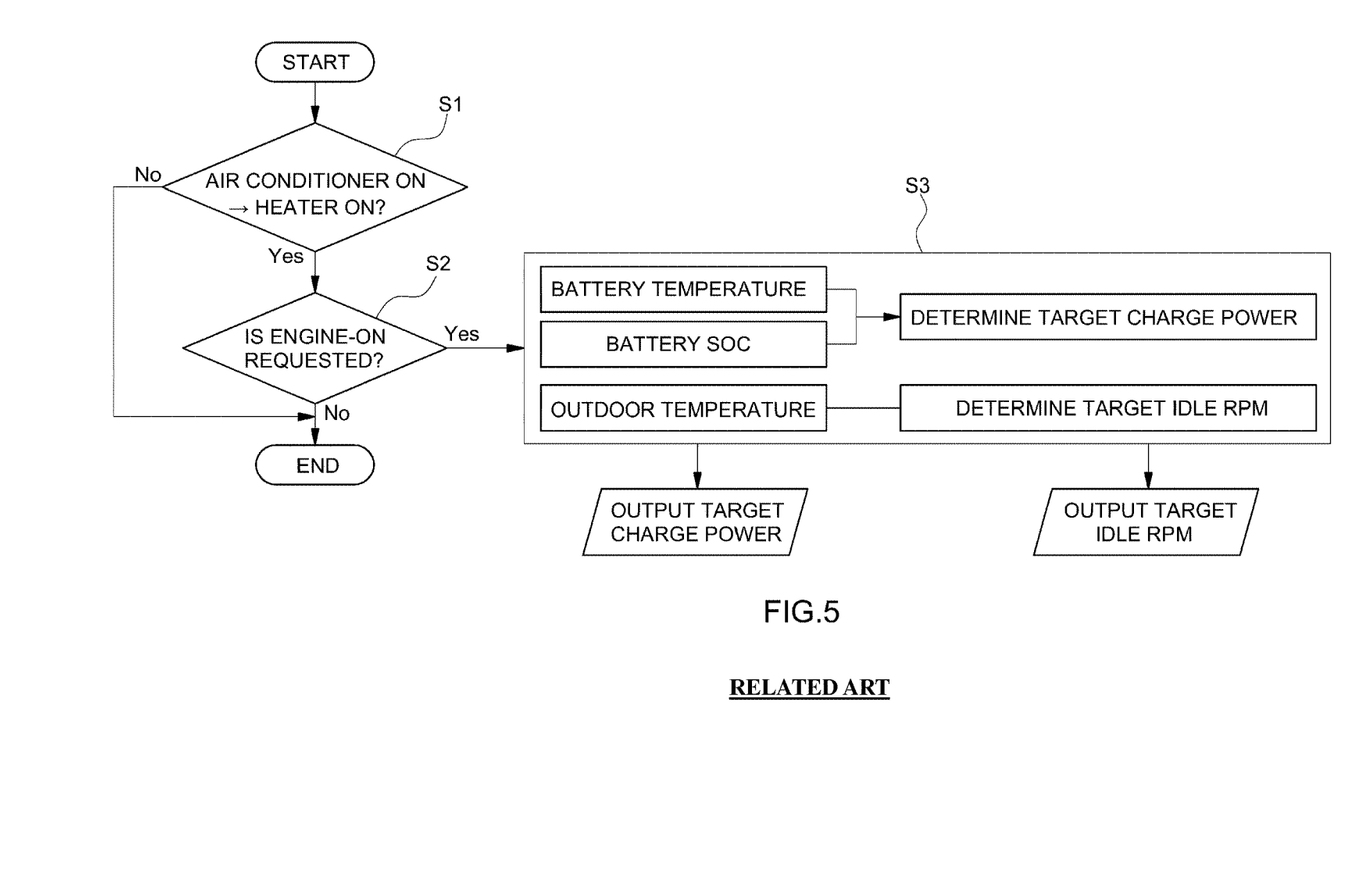
FIG. 5 is a flowchart illustrating a typical engine idle operation control process during engine-on for heating according to the related art.

FIG. 5 is a flowchart illustrating a process of controlling the engine idle operation during the heating. In the engine-off state, the air conditioning apparatus is turned on, and particularly, the heater is turned on by the operation of a driver (S1), and then under the condition that indoor heating of a vehicle is required, the air conditioning controller (FATC) is configured to request engine-on from the vehicle controller (HCU) (S2). Thus, when there is a request for engine-on for heating from the air conditioning controller (FATC), the vehicle controller (HCU) is configured to determine a target RPM for the engine idle driving based on the outdoor temperature (S3).

In other words, the target RPM (hereinafter, referred to as 'target idle RPM') for operating and maintaining the engine at the idle state based on the outdoor temperature detected by the outdoor sensor is determined, and then the vehicle controller (HCU) is configured to deliver a command based on the determined target idle RPM. Then, after the start of the engine, the engine controller is configured to adjust the engine RPM into the target idle RPM based on the command of the vehicle controller (HCU).

Additionally, a target charge power during the engine idle operation is determined from battery state information, i.e., battery temperature and State of Charge (SOC) of the battery which are received from a battery controller (Battery Management System (BMS)) (S3), the power generation of the HSG is adjusted based on the determined target charge power. However, since the engine idle operation region is limitedly determined by the target idle RPM determined by the outdoor temperature and the idle charge power determined by the battery state, the battery may be charged in a section where the engine efficiency is reduced, and the motor power may be used in a section where charging of good engine efficiency is possible, causing the fuel efficiency to be reduced.

Further, since the heating load, i.e., heating demand determined by the outdoor temperature, when the indoor temperature increases through initial start-up and heating thereafter, the engine operation is adjusted into the same idle RPM and torque. Accordingly, there is a limitation in that the reduction of the heating load due to the increasing of the indoor temperature in the same outdoor temperature state may not be compensated for.

The above information disclosed in this section is merely for enhancement of understanding of the background of the invention and therefore it may contain information that does not form the prior art that is already known in this country to a person of ordinary skill in the art.

SUMMARY

The present invention provides an engine idle operation control method and system which improve the fuel efficiency of a vehicle through the maintenance of efficient battery State of Charge (SOC) and charge control during the engine-on for winter season heating of a hybrid electric vehicle.

The present invention also provides an engine idle operation control method and system which reduce the engine-on maintenance time for heating and thereby improve the fuel efficiency of a vehicle, by appropriately reacting to (e.g., compensating for, dealing with, etc.) the actual heating load during the engine-on for winter season heating in a hybrid electric vehicle.

In one aspect, the present invention provides an engine idle operation control method for heating of a hybrid electric vehicle that may include: receiving an engine-on request for heating of a hybrid electric vehicle equipped with an engine and a first motor for driving the vehicle, an engine clutch disposed between the engine and the first motor, and a second motor power-transmittably connected to the engine when the engine is in a stop state; determining a road condition on which a vehicle is traveling; determining a target charge power controlling a power generation of the HSG and set as a value that corresponds to the road condition and battery state information; determining a basic idle RPM set as a value that corresponds to the road condition, the target charge power, and the outdoor temperature detected by an outdoor temperature sensor; determining a compensation RPM based on a heating load of a vehicle; determining a target idle RPM by compensating for the basic idle RPM by the compensation RPM; and adjusting the engine idle driving into the determined target idle RPM during the heating of a vehicle.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

1: engine
2: engine clutch
3: first motor (drive motor)
4: transmission
5: inverter
6: battery
7: second motor (HSG)

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid electric vehicles, electric vehicles, plug-in hybrid electric vehicles, hydrogen-powered vehicles and other alternative fuel vehicles (e.g. fuels derived from resources other than petroleum). As referred to herein, a hybrid electric vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings so that those skilled in the art can easily carry out the present invention.

Figure 6:
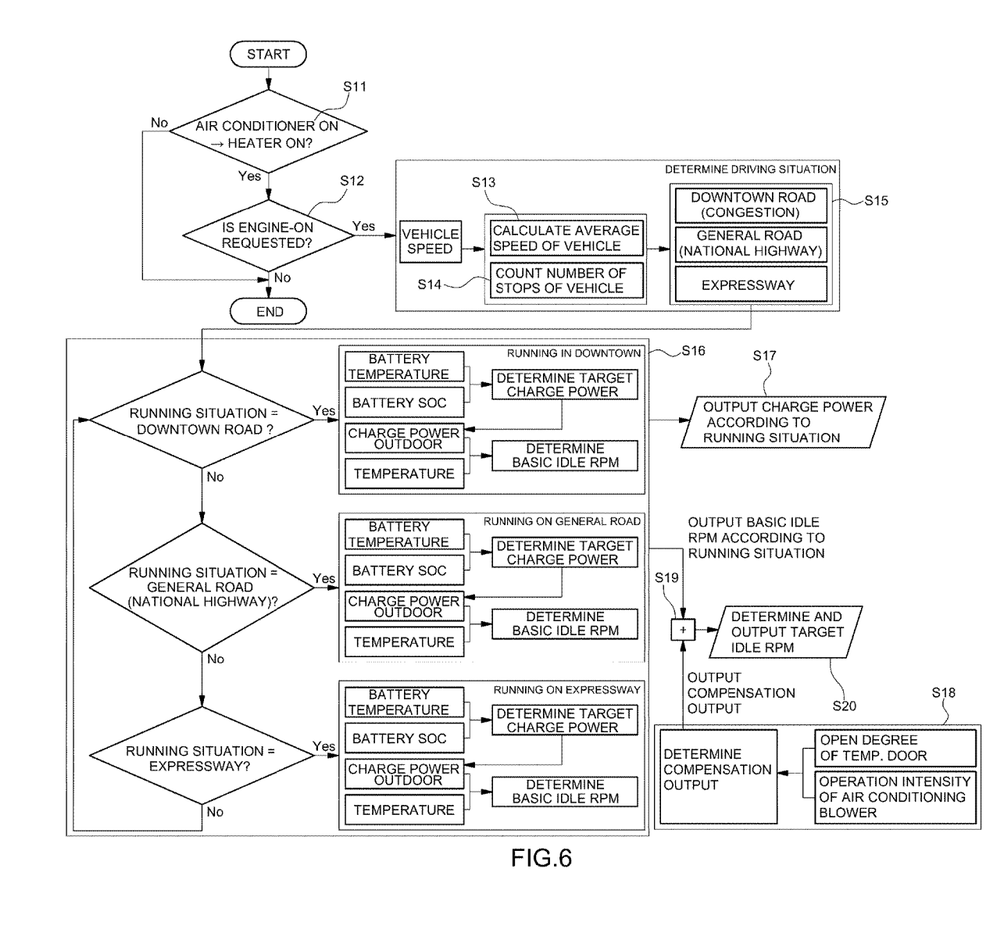
FIG. 6 is a flowchart illustrating an engine idle operation control process during engine-on for heating according to an exemplary embodiment of the present invention.

FIG. 6 is a flowchart illustrating an engine idle operation control process during engine-on for heating according to an exemplary embodiment of the present invention. The method described herein below may be understood to be executed by a controller having a memory and a processor. First, in an engine-off state, the air conditioning apparatus may be turned on, and particularly, the heater may be turned on by the operation of a driver (S11), and then under the condition that indoor heating of a vehicle is required or requested based on the outdoor temperature, the air conditioning controller (FATC) may be configured to request engine-on for heating from the vehicle controller (HCU) (S12).

Thus, the vehicle controller may be configured to determine the running state of a vehicle to determine a target charge power and a target idle RPM. Particularly, the running state of a vehicle may be information regarding a road on which the vehicle is traveling which may be determined using the previous average speed and the number of vehicle stops. When the running state of a road is determined, a vehicle controller may be configured to calculate the average speed of a vehicle for a previous set time using the vehicle speed input from a vehicle speed detecting unit (e.g., a speed sensor) while the vehicle is being driven (S13), and may also be configured to count the number of vehicle stops (S14).

In particular, the average speed of a vehicle for a set time may be updated on a cycle. Additionally, the vehicle controller may be configured to count the number of vehicle stops for a predetermined time. For example, the number of stops may be set to be counted for the same set time as the process of calculating the average speed of a vehicle, and may be set to be updated for the previous set time on the same cycle. As a stop condition for counting the number of vehicle stops, for example, when the vehicle speed is equal to or less than about 1 km/h, a vehicle may be determined as stopping. However, the present invention is not limited thereto, and the speed for determination may be variously changed.

The average speed of a vehicle and the number of vehicle stops may be obtained as described above. Particularly, in the running state determination process (S15), when a vehicle is in a low speed running state where the average speed of a vehicle is equal to or less than a reference speed 1 and the number of vehicle stops is equal to or greater than a reference number 1, a road on which a vehicle is traveling may be determined as a downtown road having multiple congestion sections.

Further, when a vehicle is in a high speed running state where the average speed of a vehicle is equal to or greater than a reference speed 2 (e.g., reference speed 2>reference speed 1) and the number of vehicle stops is equal to or less than a reference number 2 (e.g., reference number 2<reference number 1), a road on which a vehicle is traveling may be determined as an expressway (e.g., highway, a road with a substantially high speed limit).

In addition, when the average speed and the number of vehicle stops correspond to intermediate values, i.e., the average speed of a vehicle is less than the reference speed 2 while exceeding the reference speed 1 and the number of vehicle stops is less than the reference number 1 while exceeding the reference number 2, a road on which a vehicle is traveling may be determined as a general road such as national highway.

When the running state is determined, a target charge power and a target idle RPM based on the running state may be determined. In other words, the vehicle controller may be configured to determine as the traveling (e.g., running) road information whether a vehicle is traveling on a downtown road, a national highway, or a expressway, and then may be configured to determine the target charge power and the target idle RPM based on the road information. The target charge power may be determined using the battery state information, i.e., battery temperature and battery SOC received from a battery controller (Battery Management System; BMS) (S16).

In particular, a look-up table in which the target charge power is set as values based on the battery temperature and the battery SOC may be used to determine the target charge power. Particularly, separate look-up tables may be set and stored for each of downtown road, national highway, and expressway to thus determine the target charge power based on the road information (running state). Additionally, the target charge power determined as above may be used to determine a basic target RPM and a basic idle RPM for adjusting the engine into an idle state upon engine-on for heating.

The basic idle RPM upon engine-on for heating may be determined based on a heating load of a vehicle. In this exemplary embodiment, the target charge power reflecting the batter state may be additionally used together with the heating load (S16). The heating load reflected in the basic idle RPM may be an outdoor temperature detected by an outdoor temperature sensor, and the basic idle RPM may be determined using the look-up table from the target charge power and the outdoor temperature.

In other words, a look-up table in which the basic idle RPM is set as values based on the target charge power and the outdoor temperature may be used to determine the basic idle RPM. Additionally, separate look-up tables may be set and stored for each of downtown road, national highway, and expressway to thus determine the basic idle RPM based on the road information (running state).

Meanwhile, when the target charge power and the basic idle RPM based on the running state are determined, the vehicle controller (HCU) may be configured to determine the final target idle RPM by compensating for a value in which an additional heating load is reflected in the basic idle RPM such that an actual heating load may be reflected in the outdoor temperature (S18).

Particularly, the additional heating load may become a current air conditioner control value to reflect the actual heating load, and may become the opening degree of the temp. door and the operation intensity of the air conditioning blower. In other words, the compensation RPM may be determined from the opening degree of the temp. door and the operation intensity of the air conditioning blower, and the final target idle RPM may be determined by adding the compensation RPM to the basic idle RPM (S19 and S20).

The opening degree of the temp. door and the operation intensity of the air conditioning blower may represent the real-time heating load of a vehicle. The optimization of the engine idle state may be achieved in a direction of reducing the engine-on maintenance time for heating by determining the target idle RPM through reflection of the opening degree of the temp. door and the operation intensity of the air conditioning blower. Thus, the fuel efficiency may be improved.

In a conventional air conditioner for a vehicle, the air conditioning blower may be operated to be driven in a stage selected by the air conditioning controller. Since the RPM may be determined by each stage, when the stage is determined, the air conditioning controller may be configured to adjust the driving voltage applied to the air conditioning blower to drive the air conditioning blower in RPM based on the corresponding stage. Accordingly, the operation intensity of the air conditioning blower in this exemplary embodiment may become a driving stage of the air conditioning controller, or may become a driving voltage applied to the air conditioning blower corresponding to the stage.

When the compensation RPM based on the opening degree of the temp. door and the operation intensity of the air conditioning blower is determined, the look-up table in which the compensation RPM may be set as values according to the opening degree of the temp. door and the operation intensity (operation stage) of the air conditioning blower may be used, and the final target idle RPM may be determined by adding the compensation RPM determined from the look-up table to the basic idle RPM.

Finally, under the operation of the vehicle controller, a second motor power-transmittably connected to the engine may be driven to start the engine (engine-on), and then the engine may be driven into the idle driving state while the engine clutch is in an open state. When the vehicle controller delivers a command based on the target idle RPM, the engine controller may be configured to adjust the RPM of the engine into the target idle RPM during the heating.

The second motor may be a Hybrid Starter & Generator (HSG) directly connected to the engine via a power transmission device such as a belt or a pulley. In addition, during the engine idle operation, the vehicle controller may be configured to adjust the power generation of the second motor, i.e., HSG based on the target charge power. Thus, in this exemplary embodiment, the charge power may be determined based on the running conditions of downtown roads, national highways (general roads), and expressways upon engine-on for heating, and the engine idle RPM (target idle RPM) may be determined based on the outdoor temperature and the heating load such as the opening degree of the temp. door and the operation intensity of the air conditioning blower, optimizing the engine idle operation region.

Finally, the engine idle and the charge power in which the running situation and the actual heating demand are reflected may be adjusted upon engine-on for heating, and the region of high engine efficiency may be appropriately used through the engine idle operation control. Additionally, according to the engine idle operation control of the present invention, fuel consumption for non-driving engine idle irrelevant to the driving of a vehicle may be reduced by decreasing the SOC maintenance time and the engine idle maintenance time, and thus, the fuel efficiency of a vehicle may be improved.

Generally, in the downtown running characteristics of a vehicle there are many EV driving sections in which a vehicle runs with a first motor (i.e., drive motor) since the vehicle speed and the driver demand power are substantially low. Accordingly, since the battery SOC is reduced and there are many sections where the lock-up of the engine clutch for power transmission between the engine and the first motor (i.e., drive motor) is impossible, the charge possibility frequency in a region of high engine efficiency may be low. In this exemplary embodiment, under the downtown running condition, the engine idle operation region may be determined as the region of high engine efficiency in the engine clutch lock-up impossible section by increasing the charge power by the second motor that is a low-capacity motor, and thus the battery SOC and the fuel efficiency may be improved.

Furthermore, since there are few engine clutch lock-up impossible sections in the general road such as a national highway or expressway running condition compared to the downtown running condition, charge in a region of high engine efficiency may be induced after the engine clutch lock-up by reducing the charge power during the engine idle maintenance for heating, and thus the fuel efficiency may be improved.

Additionally, the engine idle RPM may be differentiated based on the heating load (heating demand). Particularly, when the heating load is substantial, the engine-off for heating may be induced by increasing the engine RPM and thus increasing the temperature of cooling water in the same charge power, and when the heating load is minimal, the engine RPM may be reduced in the same charge power, thereby improving the engine efficiency.

According to an engine idle operation control method of the present invention, the engine idle charge power may be controlled based on various running states such as downtown road congestion section, general running and national highway, and expressway running during the engine-on for winter season heating in a hybrid electric vehicle. Thus, the overall winter season fuel efficiency may be improved through battery SOC maintenance and efficient charge control according to the running situations.

Further, since the engine idle operation may be controlled based on the actual heating load such as the driving intensity of the air conditioning blower and the degree of the temp. door as well as the outdoor temperature during the engine-on for winter season heating in a hybrid electric vehicle, the engine-on maintenance time for heating may be decreased, and thus the fuel efficiency may be improved. In addition, due to decrease of the engine-on maintenance time for heating, harmful gases generated during the engine-on may be reduced.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An engine idle operation control method for heating of a hybrid electric vehicle, comprising:
   receiving, by a controller, an engine-on request for heating of the vehicle equipped with an engine and a first motor for driving the vehicle and a second motor power-transmittably connected to the engine when the engine is in a stop state;
   determining, by the controller, a road condition on which the vehicle is traveling;
   determining, by the controller, a target charge power controlling a power generation of the second motor and set as a value corresponding to the road condition and battery state information;
   determining, by the controller, a basic idle revolutions per minute (RPM) set as a value corresponding to the road condition, the target charge power, and the outdoor temperature detected by an outdoor temperature sensor;
   determining, by the controller, a compensation RPM based on a heating load of the vehicle;
   determining, by the controller, a target idle RPM by compensating for the basic idle RPM by the compensation RPM; and
   adjusting, by the controller, the engine idle driving into the determined target idle RPM during the heating of the vehicle,
   wherein the road condition is determined as one selected from the group consisting of: a downtown road running condition, a national highway running condition, and an expressway running condition,
   wherein the road condition is determined using the number of vehicle stops and the average speed of the vehicle for a previous set time,
   wherein, under the downtown running condition, the engine idle operation region is determined as a region of high engine efficiency in the engine clutch lock-up impossible section by increasing the charge power by the second motor, and
   wherein, under the national highway running condition or the expressway running condition, the battery charging is induced after the engine clutch lock-up by reducing the charge power by the second motor.

2. The engine idle operation control method of claim 1, wherein when the vehicle is in a low speed running state where the average speed of the vehicle is equal to or less than a first reference speed and the number of vehicle stops is equal to or greater than a first reference number, a road on which the vehicle is traveling is determined as a downtown road having multiple congestion sections.

3. The engine idle operation control method of claim 2, wherein when the vehicle is in a high speed running state where the average speed of the vehicle is equal to or greater than a second reference speed and the number of vehicle stops is equal to or less than a second reference number, a road on which the vehicle is traveling is determined as an expressway.

4. The engine idle operation control method of claim 2, wherein when the average speed of the vehicle is less than the second reference speed while exceeding the first reference speed and the number of vehicle stops is less than the first reference number while exceeding the second reference number, a road on which the vehicle is traveling is determined as a national highway.

5. The engine idle operation control method of claim 1, wherein the battery condition information includes a battery temperature and a battery State of Charge (SOC).

6. The engine idle operation control method of claim 5, wherein the road condition is determined as one selected from the group consisting of: a downtown road running condition, a national highway running condition, and an expressway running condition, and a look-up table in which the target charge power is set as values based on the battery temperature and the battery SOC based on each road condition is used to determine the target charge power.

7. The engine idle operation control method of claim 1, wherein the road condition is determined as one selected from the group consisting of: a downtown road running condition, a national highway running condition, and an expressway running condition, and a look-up table in which the basic idle RPM is set as values according to the target charge power and the outdoor temperature based on each road condition is used to determine the basic idle RPM.

8. The engine idle operation control method of claim 1, wherein in the determination of the compensation RPM, the compensation RPM set as a value corresponding to the opening degree of a temperature door and the operation stage of an air conditioning blower as the heating load of the vehicle is determined.

9. The engine idle operation control method of claim 8, wherein to determine the compensation RPM, a look-up table in which the compensation RPM is set as a value according to the opening degree of the temperature door and the operation stage of the air conditioning blower is used.

10. The engine idle operation control method of claim 1, wherein in the determination of the target idle RPM, the target idle RPM is determined as a value obtained by adding the compensation RPM to the basic idle RPM.

11. An engine idle operation control system for heating of a hybrid electric vehicle, comprising:
    a memory configured to store program instructions; and
    a processor configured to execute the program instructions, the program instructions when executed configured to:
    receive an engine-on request for heating of the vehicle equipped with an engine and a first motor for driving the vehicle and a second motor power-transmittably connected to the engine when the engine is in a stop state;
    determine a road condition on which the vehicle is traveling;
    determine a target charge power controlling a power generation of the second motor and set as a value corresponding to the road condition and battery state information;
    determine a basic idle revolutions per minute (RPM) set as a value corresponding to the road condition, the target charge power, and the outdoor temperature detected by an outdoor temperature sensor;
    determine a compensation RPM based on a heating load of the vehicle;
    determine a target idle RPM by compensating for the basic idle RPM by the compensation RPM; and
    adjust the engine idle driving into the determined target idle RPM during the heating of the vehicle,
    wherein the road condition is determined as one selected from the group consisting of: a downtown road running condition, a national highway running condition, and an expressway running condition, wherein the road condition is determined using the number of vehicle stops and the average speed of the vehicle for a previous set time, wherein, under the downtown running condition, the engine idle operation region is determined as a region of high engine efficiency in the engine clutch lock-up impossible section by increasing the charge power by the second motor, and wherein, under the national highway running condition or the expressway running condition, the battery charging is induced after the engine clutch lock-up by reducing the charge power by the second motor.

12. The system of claim 11, wherein when the vehicle is in a low speed running state where the average speed of the vehicle is equal to or less than a first reference speed and the number of vehicle stops is equal to or greater than a first reference number, a road on which the vehicle is traveling is determined as a downtown road having multiple congestion sections.

13. The system of claim 12, wherein when the vehicle is in a high speed running state where the average speed of the vehicle is equal to or greater than a second reference speed and the number of vehicle stops is equal to or less than a second reference number, a road on which the vehicle is traveling is determined as an expressway.

14. The system of claim 12, wherein when the average speed of the vehicle is less than the second reference speed while exceeding the first reference speed and the number of vehicle stops is less than the first reference number while exceeding the second reference number, a road on which the vehicle is traveling is determined as a national highway.

* * * * *